United States Patent
Tarao et al.

(10) Patent No.: US 9,440,117 B2
(45) Date of Patent: Sep. 13, 2016

(54) GOLF BALL

(71) Applicant: Dunlop Sports Co., Ltd., Kobe-shi, Hyogo (JP)

(72) Inventors: Toshiyuki Tarao, Kobe (JP); Kuniyasu Horiuchi, Kobe (JP)

(73) Assignee: DUNLOP SPORTS CO. LTD., Kobe-shi (JP)

( * ) Notice: Subject to any disclaimer, the term of this patent is extended or adjusted under 35 U.S.C. 154(b) by 0 days.

(21) Appl. No.: 14/581,455

(22) Filed: Dec. 23, 2014

(65) Prior Publication Data

US 2015/0182804 A1 Jul. 2, 2015

(30) Foreign Application Priority Data

Dec. 27, 2013 (JP) .................................. 2013-272858
Dec. 27, 2013 (JP) .................................. 2013-272859

(51) Int. Cl.
*A63B 37/00* (2006.01)
*C09D 175/08* (2006.01)
*C08G 18/00* (2006.01)

(52) U.S. Cl.
CPC ....... *A63B 37/0022* (2013.01); *A63B 37/0024* (2013.01); *A63B 37/0029* (2013.01); *A63B 37/0031* (2013.01); *A63B 37/0074* (2013.01); *C08G 18/00* (2013.01); *C09D 175/08* (2013.01); *A63B 37/0037* (2013.01)

(58) Field of Classification Search
None
See application file for complete search history.

(56) References Cited

U.S. PATENT DOCUMENTS

| 6,210,295 B1 * | 4/2001 | Yoneyama | A63B 37/12 473/351 |
| 2001/0003717 A1 * | 6/2001 | Maruoka | A63B 37/0003 473/371 |
| 2009/0258730 A1 * | 10/2009 | Nakamura | A63B 37/0003 473/376 |
| 2011/0053708 A1 | 3/2011 | Isoagawa et al. | |
| 2011/0244989 A1 * | 10/2011 | Tarao | A63B 37/0022 473/385 |
| 2012/0184395 A1 * | 7/2012 | Kasashima | A63B 37/0031 473/373 |
| 2013/0203524 A1 | 8/2013 | Tarao et al. | |

FOREIGN PATENT DOCUMENTS

| JP | 09059566 | * | 3/1997 |
| JP | 2011-67595 A | | 4/2011 |
| JP | 2011-217820 A | | 11/2011 |
| JP | 2013-176530 A | | 9/2013 |

* cited by examiner

*Primary Examiner* — David Buttner
(74) *Attorney, Agent, or Firm* — Birch, Stewart, Kolasch & Birch, LLP

(57) ABSTRACT

An object of the present invention is to provide a golf ball which shows a high spin rate on approach shots and an excellent stain resistance. The present invention provides a golf ball comprising a golf ball body and a paint film formed on a surface of the golf ball body, wherein a base resin constituting the paint film is a polyurethane obtained by a reaction between a polyol composition and a polyisocyanate composition, the polyol composition contains a urethane polyol including a polyether diol having a number average molecular weight from 800 to 3000 as a constituent component, the paint film has a 10% elastic modulus of 100 kgf/cm$^2$ or less, and the 10% elastic modulus (kgf/cm$^2$) (Y) of the paint film and a molar ratio (NCO/OH) (X) of NCO of the polyisocyanate composition to OH of the polyol composition satisfy a following equation (1).

$$Y \leq 200 \times X - 75 \quad (1)$$

19 Claims, 8 Drawing Sheets

(a)

(b)

“KF series” available from Showa Denko K.K.

GOLF BALL

FIELD OF THE INVENTION

The present invention relates to a golf ball.

DESCRIPTION OF THE RELATED ART

A paint film is formed on a surface of the golf ball body. The improvement of the golf ball properties has been proposed by improving the paint film.

Japanese Patent Publication No. 2011-67595 A discloses a golf ball comprising a core, a cover situated on the external side of the core, and a paint layer situated on the external side of the cover, wherein the cover has a Shore D hardness of 61 or less, and the paint layer has a Martens hardness of 2.0 mgf/μm² or less. The golf ball is excellent in spin performance, stability of the spin rate, and durability of the paint layer.

Japanese Patent Publication No. 2011-217820 A discloses a golf ball comprising a golf ball body and a paint film formed on a surface of the golf ball body, wherein the paint film has a Martens hardness of 2.0 mgf/μm² or less, and a ratio (50% elastic modulus/10% elastic modulus) of 50% elastic modulus to 10% elastic modulus of 1.6 or more. The golf ball has a high spin rate on approach shots under the wet condition and rough condition.

Japanese Patent Publication No. 2013-176530 A discloses a golf ball comprising a golf ball body and a paint film formed on a surface of the golf ball body, wherein the golf ball has a coefficient of friction calculated using a contact force tester is 0.35 or more and 0.60 or less.

SUMMARY OF THE INVENTION

The present invention has been made in light of the aforementioned circumstances, and an object of the present invention is to provide a golf ball showing an excellent stain resistance.

The present invention provides a golf ball comprising a golf ball body and a paint film formed on a surface of the golf ball body, wherein a base resin constituting the paint film is a polyurethane obtained by a reaction between a polyol composition and a polyisocyanate composition, the polyol composition contains a urethane polyol including a polyether diol having a number average molecular weight from 800 to 3000 as a constituent component, the paint film has a 10% elastic modulus of 100 kgf/cm² or less, and the 10% elastic modulus (kgf/cm²) of the paint film and a molar ratio (NCO/OH) of the isocyanate group (NCO) of the polyisocyanate composition to the hydroxyl group (OH) of the polyol composition satisfy a following equation (1).

$$Y \leq 200 \times X - 75 \quad (1)$$

[In the equation, Y represents the 10% elastic modulus (kgf/cm²) of the paint film, X represents the molar ratio (NCO/OH) of the isocyanate group (NCO) of the polyisocyanate composition to the hydroxyl group (OH) of the polyol composition.]

According to the present invention, a golf ball showing an excellent stain resistance can be obtained.

DESCRIPTION OF THE PREFERRED EMBODIMENT

Figure 1:
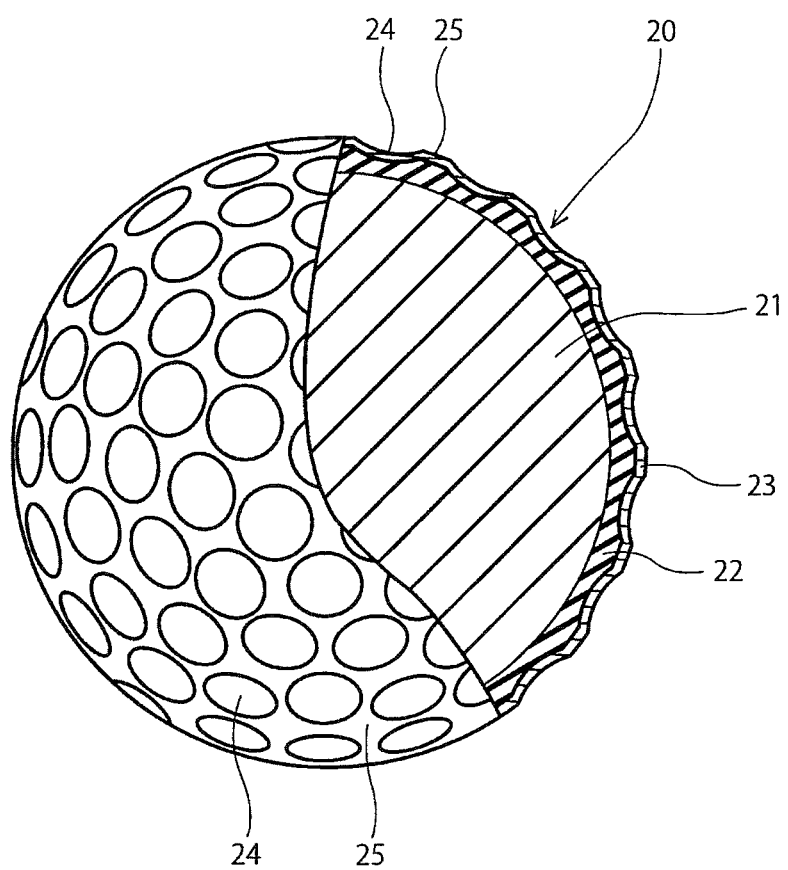
FIG. 1 is a partially cutaway view showing a golf ball according to the preferable embodiment of the present invention.

The present invention provides a golf ball comprising a golf ball body and a paint film formed on a surface of the golf ball body. A base resin constituting the paint film is a polyurethane obtained by a reaction between a polyol composition and a polyisocyanate composition.

The polyol composition and the polyisocyanate composition constituting the paint film will be described. The polyol composition contains a urethane polyol including a polyether diol having a number average molecular weight from 800 to 3000 as a constituent component. By using such a urethane polyol, the obtained paint film is soft and shows an improved spin performance. The urethane polyol is a compound having a plurality of urethane bonds in the molecule thereof, and having at least two hydroxyl groups in one molecule. An example of the urethane polyol is a urethane prepolymer which is obtained by a reaction between a polyol and a polyisocyanate, under a condition that the hydroxyl groups of the polyol is excessive to the isocyanate groups of the polyisocyanate.

Examples of the polyether diol constituting the urethane polyol includes polyoxyethylene glycol, polyoxypropylene glycol, and polyoxytetramethylene glycol. Among them, polyoxytetramethylene glycol is preferable.

The number average molecular weight of the polyether diol is 800 or more, preferably 900 or more, more preferably 1000 or more, and is 3000 or less, preferably 2000 or less, more preferably 1500 or less. If the number average molecular weight of the polyether diol is 800 or more, a distance between crosslinking points in the paint film becomes long and the paint film becomes soft, thus the spin performance is improved. If the number average molecular weight of the polyether diol is 3000 or less, a distance between cross linking points in the paint film does not become excessively long, thus the stain resistance of the paint film becomes better. The number average molecular weight of the polyol component can be measured, for example, by gel permeation chromatography (GPC), using polystyrene as a standard material, tetrahydrofuran as an eluate, and an organic solvent system GPC column (for example, "Shodex (registered trademark) KF series" available from Showa Denko K.K.) as a column.

The urethane polyol may include a low molecular weight polyol having a molecular weight of less than 500 other than the polyether diol as the polyol component. Examples of the low molecular weight polyol are a diol such as ethylene glycol, diethylene glycol, triethylene glycol, 1,3-butanediol, 1,4-butanediol, neopentyl glycol, 1,6-hexanediol; and a triol such as glycerin, trimethylolpropane, and hexanetriol. The low molecular weight polyol may be used solely or in combination of at least two of them.

The urethane polyol preferably includes a triol component and a diol component as the polyol component. Trimethylolpropane is preferred as the triol component. A mixing ratio (triol component/diol component) of the triol component to the diol component is preferably 0.2 or more, more preferably 0.5 or more, and is preferably 6.0 or less, more preferably 5.0 or less in a mass ratio.

The polyisocyanate component constituting the urethane polyol is not limited, as long as it has at least two isocyanate groups. Examples of the polyisocyanate component include an aromatic polyisocyanate such as 2,4-tolylene diisocyanate, 2,6-tolylene diisocyanate, a mixture of 2,4-tolylene diisocyanate and 2,6-tolylene diisocyanate (TDI), 4,4'-diphenylmethane diisocyanate (MDI), 1,5-naphthylene diisocyanate (NDI), 3,3'-bitolylene-4,4'-diisocyanate (TODD, xylylene diisocyanate (XDI), tetramethylxylylenediisocyanate (TMXDI), para-phenylene diisocyanate (PPDI); an alicyclic polyisocyanate or aliphatic polyisocyanate such as 4,4'-dicyclohexylmethane diisocyanate ($H_{12}$MDI), hydrogenated xylylenediisocyanate ($H_6$XDI), hexamethylene diisocyanate (HDI), isophorone diisocyanate (IPDI), and norbornene diisocyanate (NBDI). The polyisocyanate may be used solely or in combination of at least two of them.

In the urethane polyol, the content of the polyether diol having a number average molecular weight from 800 to 3000 is preferably 70 mass % or more, more preferably 72 mass % or more, and even more preferably 75 mass % or more. The polyether diol having a number average molecular weight from 800 to 3000 forms a soft segment in the paint film. Therefore, if the content of the polyether diol is 70 mass % or more, the obtained golf ball has further improved spin performance and shot feeling.

The weight average molecular weight of the urethane polyol is preferably 5000 or more, more preferably 5300 or more, even more preferably 5500 or more, and is preferably 20000 or less, more preferably 18000 or less, even more preferably 16000 or less. If the weight average molecular weight of the urethane polyol is 5000 or more, a distance between crosslinking points in the paint film becomes long and the paint film becomes soft, thus the spin performance and shot feeling improve. If the weight average molecular weight of the urethane polyol is 20000 or less, a distance between cross linking points in the paint film does not become excessively long, thus the stain resistance of the paint film becomes better.

The hydroxyl value of the urethane polyol is preferably 10 mgKOH/g or more, more preferably 15 mgKOH/g or more, even more preferably 20 mgKOH/g or more, and is preferably 200 mgKOH/g or less, more preferably 190 mgKOH/g or less, even more preferably 180 mgKOH/g or less.

The polyol composition may include a polyol compound other than the urethane polyol. Examples of the polyol compound include a low molecular weight polyol having a molecular weight of less than 500 and a high molecular weight polyol having an average molecular weight of 500 or more. Examples of the low molecular weight polyol are a diol such as ethylene glycol, diethylene glycol, triethylene glycol, 1,3-butanediol, 1,4-butanediol, neopentyl glycol, and 1,6-hexanediol; and a triol such as glycerin, trimethylolpropane, and hexanetriol. Examples of the high molecular weight polyol include a polyether polyol such as polyoxyethylene glycol (PEG), polyoxypropylene glycol (PPG), and polyoxytetramethylene glycol (PTMG); a condensed polyester polyol such as polyethylene adipate (PEA), polybutylene adipate (PBA), and polyhexamethylene adipate (PHMA); a lactone polyester polyol such as poly-ϵ-caprolactone (PCL); a polycarbonate polyol such as polyhexamethylene carbonate; and an acrylic polyol. The polyol compound may be used solely or in combination of at least two of them.

The content of the urethane polyol in the polyol compound contained in the polyol composition is preferably 60 mass % or more, more preferably 70 mass % or more, and even more preferably 80 mass % or more. It is preferable that the polyol composition contains only the urethane polyol as the polyol compound.

The hydroxyl value of the polyol contained in the polyol composition is preferably 10 mgKOH/g or more, more preferably 15 mgKOH/g or more, even more preferably 20 mgKOH/g or more, and is preferably 400 mgKOH/g or less, more preferably 300 mgKOH/g or less, even more preferably 200 mgKOH/g or less, further more preferably 170 mgKOH/g or less, particularly preferably 160 mgKOH/g or less. If the hydroxyl value of the polyol component falls within the above range, the adhesion of the paint film to the golf ball body improves. In the present invention, the hydroxyl value can be measured by using, for example, an acetylization method, in accordance with JIS K 1557-1.

Specific examples of the polyol compound are 121 B available from Wayaku Paint Co.; Nippollan 800, Nippollan 1100 available from Nippon Polyurethane Industry Co., Ltd; Burnock D6-627, Burnock D8-436, Burnock D8-973, Burnockll-408 available from DIC Corporation; Desmophen 650 MPA, Desmophen 670, Desmophen 1150, Desmophen A160X available from Sumika Bayer Urethane Co., Ltd; and Hariacron 2000, Hariacron 8500H available from Harima Chemicals, Inc.

Next, the polyisocyanate composition will be described. The polyisocyanate composition comprises one or more polyisocyanate compound. Examples of the polyisocyanate compound include a compound having at least two isocyanate groups.

Examples of the polyisocyanate compound include an aromatic diisocyanate such as 2,4-tolylene diisocyanate, 2,6-tolylene diisocyanate, a mixture (TDI) of 2,4-tolylene diisocyanate and 2,6-tolylene diisocyanate, 4,4'-diphenylmethane diisocyanate (MDI), 1,5-naphthylene diisocyanate (NDI), 3,3'-bitolylene-4,4'-diisocyanate (TODD, xylylene diisocyanate (XDI), tetramethylxylylenediisocyanate (TMXDI) and para-phenylene diisocyanate (PPDI); an alicyclic diisocyanate or aliphatic diisocyanate such as 4,4'-dicyclohexylmethane diisocyanate ($H_{12}$MDI), hydrogenated xylylenediisocyanate ($H_6$XDI), hexamethylene diisocyanate (HDI), isophorone diisocyanate (IPDI), norbornene diisocyanate (NBDI); and a triisocyanate such as an allophanate-modified product, a biuret-modified product, an isocyanurate-modified product and an adduct of the above diisocyanate. In the present invention, two or more polyisocyanates are preferably used.

The allophanate-modified product is, for example, a triisocyanate which is obtained by further reacting a diisocyanate with a urethane bond formed through a reaction between a diisocyanate and a low molecular weight diol. The adduct product is a triisocyanate which is obtained through a reaction between a diisocyanate and a low molecular weight triol such as trimethylolpropane or glycerin. The biuret-modified product is, for example, a triisocyanate having a biuret bond represented by the following formula (1). The isocyanurate-modified product of diisocyanate is, for example, a triisocyanate represented by the following formula (2).

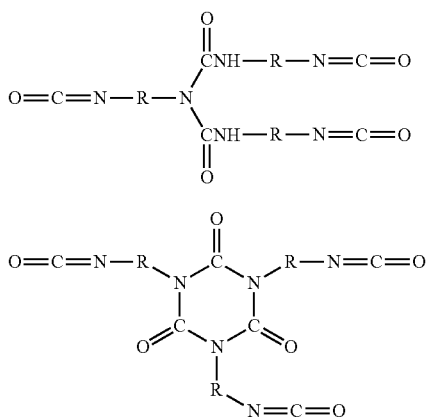

In the formulae (1) and (2), R represents a residue where isocyanate groups are removed from the diisocyanate.

As the triisocyanate, an isocyanurate-modified product of hexamethylene diisocyanate, a biuret-modified product of hexamethylene diisocyanate, and an isocyanurate-modified product of isophorone diisocyanate are preferable. Especially, in the case of using the biuret-modified product of hexamethylene diisocyanate and the isocyanurate-modified product of hexamethylene diisocyanate in combination, a mixing ratio (biuret-modified product/isocyanurate-modified product) thereof preferably ranges from 20/40 to 40/20, and more preferably ranges from 25/35 to 35/25.

In the present invention, the polyisocyanate composition preferably contains the triisocyanate compound. The content of the triisocyanate compound in the polyisocyanate contained in the polyisocyanate composition is preferably 50 mass % or more, more preferably 60 mass % or more, and even more preferably 70 mass % or more. It is most preferable that the polyisocyanate composition contains only the triisocyanate compound as the polyisocyanate compound.

The content of the isocyanate group (NCO %) of the polyisocyanate contained in the polyisocyanate composition is preferably 0.5 mass % or more, more preferably 1 mass % or more, even more preferably 2 mass % or more, and is preferably 45 mass % or less, more preferably 40 mass % or less, even more preferably 35 mass % or less. The content of the isocyanate group (NCO %) of the polyisocyanate can be defined by the following expression.

NCO(%)=100×[mole number of isocyanate group in polyisocyanate×42 (molecular weight of NCO)]/ total mass (g) of polyisocyanate Specific examples of the polyisocyanate are Burnock D-800, Burnock DN-950, Burnock DN-955 available from DIC corporation; Desmodur N75MPA/X, Desmodur N3300, Desmodur L75 (C), Sumidur E21-1 available from Sumika Bayer Urethane CO., Ltd; Coronate HX, Coronate HK available from Nippon Polyurethane Industry Co., Ltd; Duranate 24A-100, Duranate 21S-75E, Duranate TPA-100, Durante TKA-100 available from Asahi Kasei Chemicals Corporation; and VESTANAT T1890 available from Degussa.

In the reaction between the polyol composition and the polyisocyanate composition, the molar ratio (NCO/OH) of the isocyanate group (NCO) of the polyisocyanate composition to the hydroxyl group (OH) of the polyol composition is preferably more than 0.5, more preferably 0.55 or more, and even more preferably 0.60 or more. If the molar ratio (NCO/OH) is more than 0.5, the crosslinking density becomes high, thus the stain resistance of the obtained paint film becomes better. Further, if the molar ratio (NCO/OH) is too large, the amount of the isocyanate group becomes excessive, and the obtained paint film does not only become hard and fragile but also has the poor appearance. Thus, the molar ratio (NOC/OH) is preferably 1.20 or less, more preferably 1.15 or less, and even more preferably 1.10 or less. The reason why the appearance of the obtained paint film deteriorates if the amount of the isocyanate group is excessive in the paint is considered to be that an excessive amount of isocyanate group in the paint may promote a reaction between the moisture in the air and the isocyanate group, thereby generating a lot of carbon dioxide gas.

The 10% elastic modulus of the paint film is preferably 100 kgf/cm$^2$ (9.8 MPa) or less, more preferably 90 kgf/cm$^2$ (8.8 MPa) or less, and even more preferably 80 kgf/cm$^2$ (7.8 MPa) or less. If the 10% elastic modulus is 100 kgf/cm$^2$ or less, the paint film is soft, the spin rate on approach shots increases, and shot feeling becomes better. The lower limit of the 10% elastic modulus of the paint film is not particularly limited, but 5 kgf/cm$^2$ (0.49 MPa) is preferable, and 10 kgf/cm$^2$ (0.98 MPa) is more preferable. If the 10% elastic modulus is too low, the paint film becomes too soft and tacky. Thus, the feeling becomes worse.

The paint film has the 10% elastic modulus (kgf/cm$^2$) and the molar ratio (NCO/OH) of the isocyanate group (NCO) of the polyisocyanate composition to the hydroxyl group (OH) of the polyol composition satisfying the following equation (1). The paint film satisfying the following equation (1) can maintain the softness even if the molar ratio (NCO/OH) increases, therefore the obtained golf ball shows a high spin rate on approach shots and an excellent stain resistance.

$$Y \leq 200 \times X - 75 \quad (1)$$

[In the equation, Y represents the 10% elastic modulus (kgf/cm$^2$) of the paint film, X represents the molar ratio (NCO/OH) of the isocyanate group (NCO) of the polyisocyanate composition to the hydroxyl group (OH) of the polyol composition.]

The paint film of the golf ball of the present invention is preferably formed from a paint containing the polyol composition and the polyisocyanate composition. An example of the paint is a so-called two-component curing type paint containing the polyol as a base material and the polyisocyanate as a curing agent. The paint may be either a waterborne paint mainly containing water as a dispersion medium or a solvent-based paint mainly containing an organic solvent as a dispersion medium. In the case of the solvent-based paint, preferable solvents are, for example, toluene, isopropyl alcohol, xylene, methyl ethyl ketone, methyl ethyl isobutyl ketone, ethyleneglycol monomethyl ether, ethyl benzene, propyleneglycol monomethyl ether, isobutyl alcohol, and ethyl acetate.

The paint may further contain, where necessary, an additive such as a filler, an ultraviolet absorber, an antioxidant, a light stabilizer, a fluorescent brightener, an anti-blocking agent, a leveling agent, a slip agent and a viscosity modifier, which are generally contained in the paint for a golf ball.

Next, the applying method of the curing type paint of the present invention will be described. The applying method of the curing type paint is not limited, and includes conventional methods, for example, spray coating method or electrostatic coating method.

In the case of applying the paint with an air gun, the polyol composition and the polyisocyanate composition may be fed with the respective pumps and continuously mixed through the line mixer located in the stream line just before the air gun, and the obtained mixture can be air-sprayed. Alternatively, the polyol composition and the polyisocyanate composition can be air-sprayed respectively with an air spray system having a device for controlling the mixing ratio thereof. The paint application may be conducted by spraying the paint one time or overspraying the paint multiple times.

The curing type paint applied to the golf ball body can be dried, for example, at a temperature ranging from 30° C. to 70° C. for 1 hour to 24 hours to form the paint film.

The thickness of the paint film after drying is preferably, without limitation, 5 μm or more, more preferably 6 μm or more, even more preferably 10 μm or more, and most preferably 15 μm or more. If the thickness is less than 5 μm, the paint film is likely to wear off due to the continued use. Further, by thickening the paint film, the spin rate on approach shots increases and shot feeling becomes better. The thickness of the paint film is preferably 50 μm or less, more preferably 45 μm or less, and even more preferably 40 μm or less. If the thickness of the paint film is more than 50 μm, the dimple effect is lowered, thus the flight performance of the golf ball tends to be low. The thickness of the paint film can be measured, for example, by observing the cross section of the golf ball using a microscope (VHX-1000 available from Keyence Corporation). In the case of overpainting the paint multiple times, a total thickness of the whole paint film formed preferably falls within the above range.

The golf ball of the present invention is not particularly limited, as long as it comprises a golf ball body and a paint film formed on the surface of the golf ball body. The construction of the golf ball body is not particularly limited, the golf ball body of the present invention may be a one-piece golf ball, a two-piece golf ball, a three-piece golf ball, a four-piece golf ball and a multi-piece golf ball with at least five piece, or a wound golf ball. The present invention can be applied appropriately to any one of the above golf balls.

FIG. 1 is a partially cutaway view showing a golf ball 20 according to the preferable embodiment of the present invention. The golf ball 20 comprises a spherical core 21, a cover 22 covering the spherical core 21, and a paint film 23 formed on the surface of the cover 22. On the surface of the cover 22, a plurality of dimples 24 are formed. Among the surface of the cover 22, a part other than the dimples 24 is a land 25.

It is preferable that the golf ball body has a core and a cover covering the core. In this case, the cover may be a soft cover having a low hardness or a hard cover having a high hardness.

The soft cover preferably has a hardness of 60 or less, more preferably 55 or less, even more preferably 50 or less, most preferably 45 or less in Shore D hardness. If the cover has a hardness of 60 or less in Shore D hardness, the spin rate becomes higher. The lower limit of the hardness of the soft cover is not particularly limited, but is preferably 10, more preferably 15, and even more preferably 20 in Shore D hardness. The hardness of the cover is a slab hardness obtained by measuring the cover composition molded into a sheet form.

The 10% elastic modulus of the soft cover is preferably less than 120 kgf/cm$^2$ (11.8 MPa), more preferably 110 kgf/cm$^2$ (10.8 MPa) or less, and even more preferably 100 kgf/cm$^2$ (9.8 MPa) or less. If the 10% elastic modulus is less than 120 kgf/cm$^2$, the cover is soft and the spin rate on approach shots further increases. The lower limit of the 10% elastic modulus of the soft cover is not particularly limited, but is preferably 5 kgf/cm$^2$ (0.49 MPa), and more preferably 10 kgf/cm$^2$ (0.98 MPa). If the 10% elastic modulus is excessively low, the cover becomes too soft, and feeling become worse.

The thickness of the soft cover is preferably 0.1 mm or more, more preferably 0.2 mm or more, even more preferably 0.3 mm or more, and is preferably 1.0 mm or less, more preferably 0.9 mm or less, even more preferably 0.8 mm or less. If the thickness of the soft cover is 0.1 mm or more, the shot feeling of the golf ball becomes better. If the thickness of the soft cover is 1.0 mm or less, the resilience of the golf ball can be maintained.

The hard cover preferably has a hardness of more than 60, more preferably 62 or more, even more preferably 64 or more, and most preferably 66 or more in Shore D hardness. If the cover has a hardness of more than 60 in Shore D hardness, the flight distance on driver shots becomes greater. The upper limit of the hardness of the hard cover is not particularly limited, but is preferably 75, more preferably 73, and even more preferably 71 in Shore D hardness.

The 10% elastic modulus of the hard cover is preferably 120 kgf/cm$^2$ (11.8 MPa) or more, more preferably 123 kgf/cm$^2$ (12.1 MPa) or more, and even more preferably 126 kgf/cm$^2$ (12.4 MPa) or more. If the 10% elastic modulus is 120 kgf/cm$^2$ or more, the cover is hard and the flight distance on driver shots increases. The upper limit of the 10% elastic modulus of the hard cover is not particularly limited, but is preferably 280 kgf/cm$^2$ (27.5 MPa), and more preferably 275 kgf/cm$^2$ (27.0 MPa). If the 10% elastic modulus is excessively high, the cover becomes too hard, and feeling become worse.

The thickness of the hard cover is preferably 0.5 mm or more, more preferably 0.6 mm or more, even more preferably 0.7 mm or more, and is preferably 3.0 mm or less, more preferably 2.7 mm or less, even more preferably 2.4 mm or less. If the thickness of the hard cover is 0.5 mm or more, the flight distance of the golf ball further increases, and if the thickness of the hard cover is 3.0 mm or less, the shot feeling of the golf ball becomes better.

The golf ball of the present invention preferably has a difference (|10% elastic modulus of paint film-10% elastic modulus of cover|) between the 10% elastic modulus (kgf/cm$^2$) of the paint film and the 10% elastic modulus (kgf/cm$^2$) of the cover of 65 kgf/cm$^2$ (6.4 MPa) or less, more preferably 60 kgf/cm$^2$ (5.9 MPa) or less, and even more preferably 55 kgf/cm$^2$ (5.4 MPa) or less. If the difference between the 10% elastic modulus of the paint film and the 10% elastic modulus of the cover is 65 kgf/cm$^2$ or less, the shot feeling of the golf ball becomes better.

The cover material constituting the cover is not particularly limited, and includes, for example, an ionomer resin, polyurethane, polyamide, polyester, polystyrene. Among them, the polyurethane, ionomer resin, and polyamide are preferable.

The soft cover is preferably formed from a cover resin composition containing a polyurethane. In this case, a content of the polyurethane in the cover resin composition is preferably 50 mass % or more, more preferably 70 mass % or more, and even more preferably 90 mass % or more. In addition, the hard cover is preferably formed from a cover resin composition containing an ionomer resin and/or a polyamide. In this case, a total content of the ionomer resin and the polyamide in the cover resin composition is preferably 50 mass % or more, more preferably 70 mass % or more, and even more preferably 90 mass % or more.

The polyurethane may be either a thermoplastic polyurethane or a thermosetting polyurethane. The thermoplastic polyurethane is a polyurethane exhibiting plasticity when heated and generally means a polyurethane having a linear chain structure of a high-molecular weight to a certain extent. On the other hand, the thermosetting polyurethane (two-component curing type polyurethane) is a polyurethane obtained by polymerization through a reaction between a low-molecular weight urethane prepolymer and a curing agent (chain extender) when molding the cover. The thermosetting polyurethane includes a polyurethane having a linear chain structure or a polyurethane having a three-dimensional crosslinked structure depending on a number of a functional group of the prepolymer or the curing agent (chain extender) to be used. As the polyurethane, a thermoplastic elastomer is preferable.

Examples of the ionomer resin include: a product obtained by neutralizing, with a metal ion, at least part of the carboxylic groups in a binary copolymer composed of an olefin and an α,β-unsaturated carboxylic acid having 3 to 8 carbon atoms; a product obtained by neutralizing, with a metal ion, at least part of the carboxylic groups in a ternary copolymer composed of an olefin, an α,β-unsaturated carboxylic acid having 3 to 8 carbon atoms and an α,β-unsaturated carboxylic acid ester; a mixture thereof. The olefin preferably includes an olefin having 2 to 8 carbon atoms. Examples of the olefin include ethylene, propylene, butene, pentene, hexene, heptene, octane and the like. Among them, ethylene is particularly preferred. Examples of the α,β-unsaturated carboxylic acid having 3 to 8 carbon atoms include acrylic acid, methacrylic acid, fumaric acid, maleic acid, crotonic acid and the like. Among these, acrylic acid and methacrylic acid are particularly preferred. Examples of the α,β-unsaturated carboxylic acid ester include methyl ester, ethyl ester, propyl ester, n-butyl ester, isobutyl ester of acrylic acid, methacrylic acid, fumaric acid, maleic acid and the like. Among them, acrylic acid ester and methacrylic acid ester are particularly preferable. Among these ionomer resins, a metal ion-neutralized product of a binary copolymer of ethylene-(meth)acrylic acid, and a metal ion-neutralized product of a ternary copolymer of ethylene-(meth)acrylic acid-(meth)acrylic acid ester are preferable.

Examples of the cover material include: an ionomer resin having a trade name of "Himilan (registered trademark)" commercially available from Du Pont-Mitsui Polychemicals Co., Ltd., a thermoplastic polyurethane elastomer having a trade name of "Elastollan (registered trademark)" commercially available from BASF Japan Ltd, a thermoplastic polyamide elastomer having a trade name of "Pebax (registered trademark)" commercially available from Arkema Inc., a thermoplastic polyester elastomer having a trade name of "Hytrel (registered trademark)" commercially available from Du Pont-Toray Co., Ltd., a thermoplastic styrene elastomer having a trade name of "Rabalon (registered trademark)" or a thermoplastic polyester elastomer having a trade name of "Primalloy" commercially available from Mitsubishi Chemical Corporation, and the like. These cover materials may be used solely or in combination of at least two types thereof.

The cover may contain a pigment component such as a white pigment (for example, titanium oxide), a blue pigment and a red pigment, a specific gravity adjusting agent such as calcium carbonate and barium sulfate, a dispersant, an antioxidant, an ultraviolet absorber, a light stabilizer, a fluorescent material, a fluorescent brightener, or the like, as long as they do not impair the performance of the cover.

The embodiment for molding the cover from the cover composition is not particularly limited, and includes an embodiment which comprises injection molding the cover composition directly onto the core, or an embodiment which comprises molding the cover composition into a hollow shell, covering the core with a plurality of the hollow shells and subjecting the core with a plurality of the hollow shells to the compression-molding (preferably the embodiment which comprises molding the cover composition into a half hollow-shell, covering the core with two of the half hollow-shells and subjecting the core with two of the half hollow-shells to the compression-molding). After the cover is molded, the golf ball body is ejected from the mold, and as necessary, the golf ball body is preferably subjected to surface treatments such as deburring, cleaning, and sand-blast. If desired, a mark may be formed.

The total number of the dimples formed on the cover is preferably 200 or more and 500 or less. If the total number of the dimples is less than 200, the dimple effect is hardly obtained. On the other hand, if the total number exceeds 500, the dimple effect is hardly obtained because the size of the respective dimples is small. The dimple shape (shape in a plan view) includes, for example, without limitation, a circle; a polygonal shape such as a roughly triangular shape, a roughly quadrangular shape, a roughly pentagonal shape, and a roughly hexagonal shape; and another irregular shape. The dimple shape is employed solely or in combination at least two of them.

In the present invention, the ratio of the sum of the areas of dimples to the surface area of a phantom sphere is referred to as an occupation ratio. The phantom sphere is a golf ball (spherical body) when assuming that there is no dimples on the surface thereof. In the golf ball of the present invention, the occupation ratio of the dimples is preferably 60% or more, more preferably 63% or more, even more preferably 66% or more, and is preferably 90% or less, more preferably 87% or less, even more preferably 84% or less. If the occupation ratio is too high, the contribution of the paint film to the coefficient of friction becomes small. Further, if the occupation ratio is too low, the flight performance is lowered.

The area of the dimple refers to the area enclosed in the periphery of the dimple when observing the central point of the golf ball from infinity. In the case of the circular dimple, the area S of the dimple is calculated from the following formula.

$$S=(Di/2)^2 \cdot \pi \, (Di: \text{diameter of the dimple})$$

The golf ball preferably has a diameter ranging from 40 mm to 45 mm. In light of satisfying a regulation of US Golf Association (USGA), the diameter is preferably 42.67 mm or more. In light of prevention of the air resistance, the diameter is preferably 44 mm or less, and more preferably 42.80 mm or less. The golf ball preferably has a mass of 40 g or more and 50 g or less. In light of obtaining greater inertia, the golf ball more preferably has a mass of 44 g or more, and even more preferably 45.00 g or more. In light of satisfying a regulation of USGA, the golf ball preferably has a mass of 45.93 g or less.

Next, the core used for a wound golf ball, two-piece golf ball, multi-piece golf ball, and the one-piece golf ball body will be explained.

The core or the one-piece golf ball body may employ a publicly known rubber composition (hereinafter simply referred to as "core rubber composition" occasionally), and may be molded by heat-pressing, for example, a rubber composition containing a base rubber, a crosslinking initiator and a co-crosslinking agent.

As the base rubber, particularly preferred is a high cis-polybutadiene having a cis-bond in a proportion of 40 mass % or more, more preferably 70 mass % or more, and even more preferably 90 mass % or more in view of its superior repulsion property. As the co-crosslinking agent, an α,β-unsaturated carboxylic acid having 3 to 8 carbon atoms or a metal salt thereof is preferable, and a metal salt of acrylic acid or a metal of methacrylic acid is more preferable. As the metal constituting the metal salt, zinc, magnesium, calcium, aluminum or sodium is preferable, and zinc is more preferable. The amount of the co-crosslinking agent to be used in the rubber composition is preferably 20 parts or more and 50 parts or less by mass, with respect to 100 parts by mass of the base rubber. As the crosslinking initiator, an organic peroxide is preferably used. Specific examples of the organic peroxide are dicumyl peroxide, 1,1-bis(t-butylperoxy)-3,3, 5-trimethylcyclohexane, 2,5-dimethyl-2,5-di(t-butylperoxy) hexane, and di-t-butyl peroxide. Among them, dicumyl peroxide is preferably used. The amount of the crosslinking initiator to be blended in the rubber composition is preferably 0.2 part by mass or more, more preferably 0.3 part by mass or more, and is preferably 3 parts by mass or less, more preferably 2 parts by mass or less, with respect to 100 parts by mass of the base rubber.

The core rubber composition may further contain an organic sulfur compound. As the organic sulfur compound, diphenyl disulfides, thiophenols or thionaphthols may be preferably used. The amount of the organic sulfur compound to be blended in the rubber composition is preferably 0.1 part by mass or more, more preferably 0.3 part by mass or more, and is preferably 5.0 parts by mass or less, more preferably 3.0 parts by mass or less, with respect to 100 parts by mass of the base rubber. The core rubber composition may further contain a carboxylic acid and/or a salt thereof. As the carboxylic acid and/or the salt thereof, a carboxylic acid having 1 to 30 carbon atoms and/or a salt thereof is preferred. The amount of the carboxylic acid and/or the salt thereof to be blended in the rubber composition is preferably 1 part by mass or more and 40 parts by mass or less, with respect to 100 parts by mass of the base rubber.

The core rubber composition may further contain a weight adjusting agent such as zinc oxide and barium sulfate, an antioxidant, or a colored powder in addition to the base rubber, the co-crosslinking agent, the crosslinking initiator, and the organic sulfur compound. The conditions for heat-pressing the core rubber composition should be determined appropriately depending on the rubber composition. Generally, the heat-pressing is preferably carried out for 10 to 60 minutes at a temperature of 130° C. to 200° C. or carried out in a two-step heating of heating 20 to 40 minutes at a temperature of 130° C. to 150° C. followed by heating for 5 to 15 minutes at a temperature of 160° C. to 180° C.

In the case that the golf ball of the present invention is a three-piece golf ball, a four-piece golf ball or a multi-piece golf ball with at least five-piece, examples of the material for the intermediate layer disposed between the core and the outmost cover include: a thermoplastic resin such as a polyurethane resin, an ionomer resin, a polyamide resin, and polyethylene; a thermoplastic elastomer such as a styrene elastomer, a polyolefin elastomer, a polyurethane elastomer, a polyester elastomer; and a cured product of a rubber composition. Herein, examples of the ionomer resin include a product obtained by neutralizing, with a metal ion, at least part of the carboxyl groups in a copolymer composed of ethylene and an α,β-unsaturated carboxylic acid; and a product obtained by neutralizing, with a metal ion, at least part of the carboxyl groups in a terpolymer composed of ethylene, an α,β-unsaturated carboxylic acid and an α,β-unsaturated carboxylic acid ester. The intermediate layer may further contain a specific gravity adjusting agent such as barium sulfate and tungsten, an antioxidant, and a pigment. The intermediate layer may be referred to as an inner cover layer or an outer core depending on the construction of the golf ball.

The golf ball of the present invention comprises a golf ball body and a paint film formed on a surface of the golf ball body, and preferably has a coefficient of friction calculated using a contact force tester of 0.35 or more and 0.60 or less.

In the present invention, the coefficient of friction calculated using the contact force tester is a coefficient of friction between a golf ball and a collisional plate when the golf ball collides with the collisional plate disposed inclined at a predetermined angle to the flying direction of the golf ball. By using the contact force tester, a time function Fn(t) of contact force in the direction perpendicular to the collisional plate and a time function Ft(t) of contact force in the direction parallel to the collisional plate are concurrently measured; and a maximum value of a time function M(t) which is a ratio of Ft(t) to Fn(t) represented by the following equation is defined as a coefficient of friction.

$$M(t)=Ft(t)/Fn(t)$$

Figure 2:
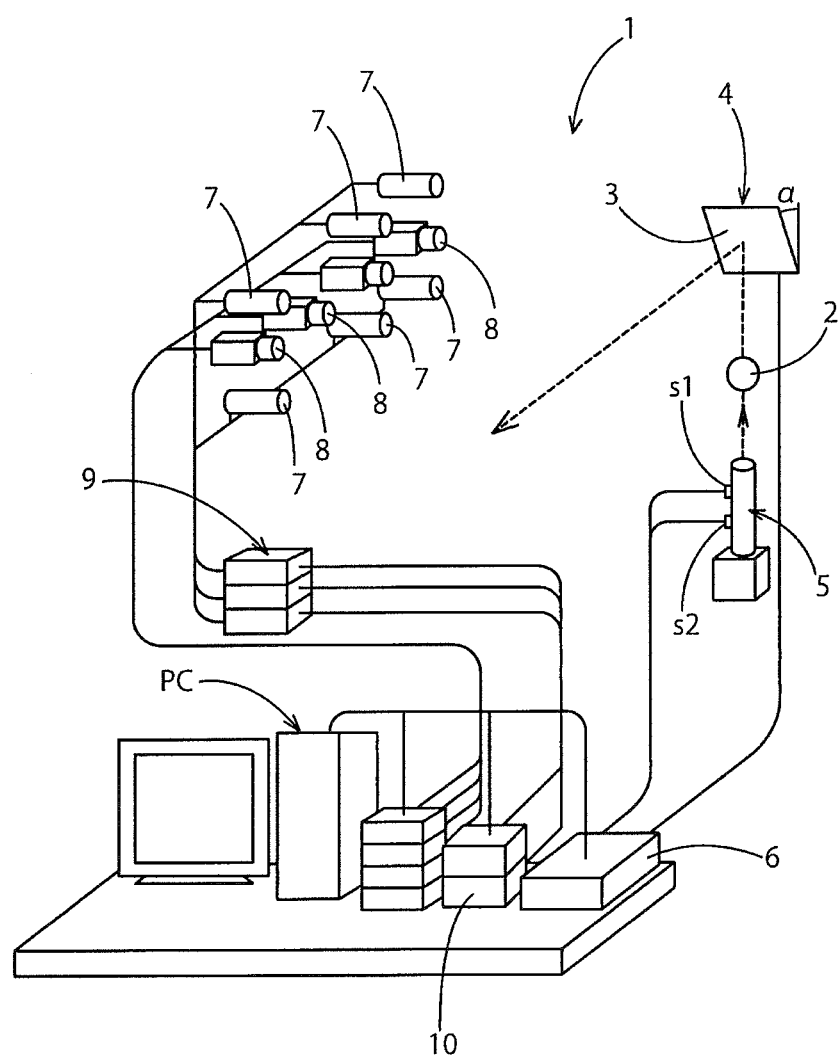
FIG. 2 is a schematic view of the contact force tester used in the present invention.
Figure 3:
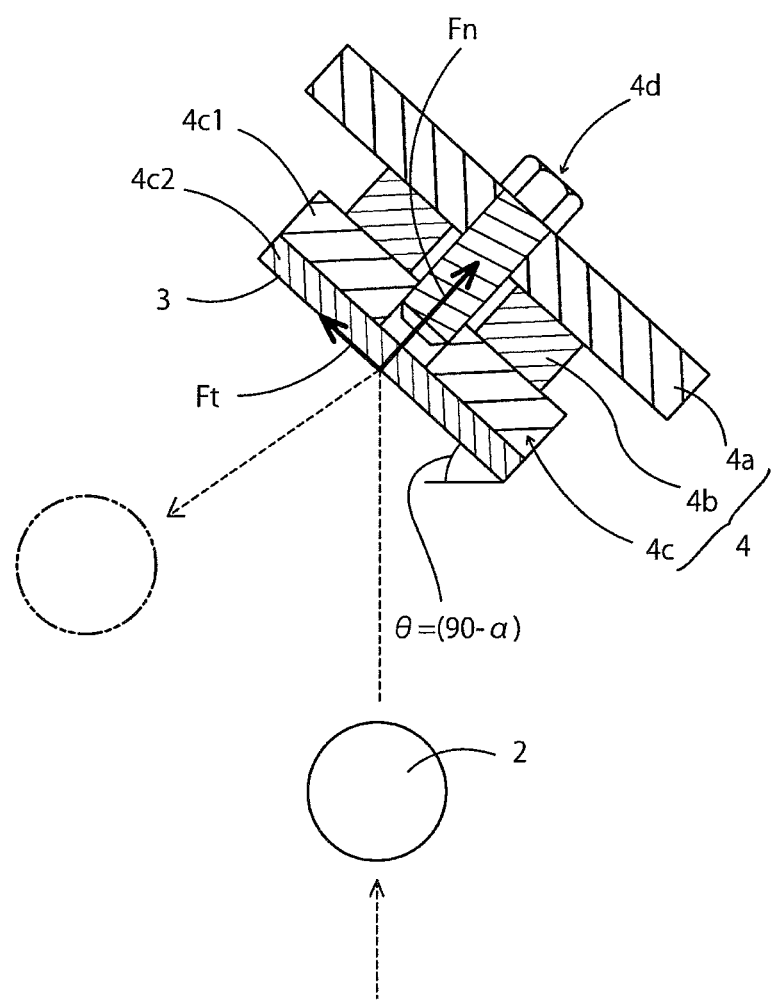
FIG. 3 is a partially enlarged cross-sectional view of the collisional plate of the contact force tester.

In the present invention, the method of calculating the coefficient of friction will be described based on FIGS. 2 to 4. FIG. 2 is a contact force tester for measuring the coefficient of friction. FIG. 3 is an enlarged cross-sectional view of a collisional plate 4 that a golf ball collides with.

The contact force tester 1 makes pseudo conditions of hitting a golf ball with a club face, and enables to measure various forces at that time. The contact force tester 1 includes, for example, a launcher 5 that launches a golf ball 2 in an upward and perpendicular direction, and a collisional plate 4 positioning on the upper side of the launched golf ball 2 and having a striking face 3 that the golf ball 2 collides with.

Since a distance between the launcher 5 and the striking face 3 is relatively short, an initial velocity of the golf ball 2 corresponds to a collision velocity. This collision velocity corresponds to a head speed of a club head in an actual golf swing. In view of this point, the collision velocity of the golf ball 2 to the striking face 3 may be set, for example, within the range of about 10 m/s to 50 m/s. In the present invention, in light of the head speed of approach shots, the initial velocity is set to 9 m/s.

The desired value of the initial velocity of the golf ball 2 is set by the volume of a controller 6 or the like. Based on a distance between a first sensor S1 and a second sensor S2 which are provided in the launcher 5 and a time difference between interrupting these sensors, the controller 6 calculates the actually measured value of the initial velocity of the golf ball 2, and outputs the value to a computer device PC.

FIG. 3 shows a partially enlarged cross-sectional view of the collisional plate 4. The collisional plate 4 can incline the striking face 3 at a predetermined angle α to the launching direction (flying direction) of the golf ball 2. In the present invention, an angle θ that is obtained by subtracting the angle α from 90 degree is defined as a collisional angle. This collisional angle θ corresponds to a loft angle of a club face (not shown) in an actual swing. Further, in consideration of the loft angle of a golf club, the collisional angle θ can be set to more than one value (for example, 15°, 20°,35°), for example, within the range from 10° to 90°, and the measurement of the contact force, which will be described later, can be conducted at each angle. In the present invention, the collisional angle θ is set to 55° in order to recreate the spin rate on approach shots.

The collisional plate 4 comprises, for example, a base plate 4a formed of a metal plate material, a superficial plate 4c constituting the striking face 3, and a pressure sensor 4b interposed therebetween, which are fixed to one another with a bolt 4d integrally.

The base plate 4a may be formed of any material without particular limitation, as long as it has a predetermined strength and rigidity, but preferably formed of steel. The base plate 4a preferably has a thickness in a range from 5.0 mm to 20.0 mm. A model number of the main bolt 4d is, for example, M10 according to Japanese Industrial Standards (JIS).

As the pressure sensor 4b, for example, a 3-component force sensor is preferably used. The pressure sensor 4b can measure, at least, a perpendicular force Fn in a direction perpendicular to the striking face 3, and a shear force Ft in a direction parallel to the striking face 3 (the direction from the sole side toward the crown side in a club face) as time-series data. The measurement of the force is conducted by connecting a charge amplifier to the pressure sensor 4b.

As the pressure sensor 4b, a variety of products may be used, for example, a 3-component force sensor (model 9067) manufactured by Kistler Instrument Corp. is preferably used. This sensor enables to measure force components in a parallel direction, a Y direction and a perpendicular direction. Although not illustrated, the measurement of the pressure is conducted by connecting a charge amplifier (model 5011B manufactured by Kistler Instrument Corp.) to the pressure sensor 4b. The pressure sensor 4b is formed in its center with a through-hole through which the main bolt 4d is inserted to integrally fix the pressure sensor 4b with the base plate 4a.

The superficial plate 4c is composed of a main body 4c1 and a superficial material 4c2 which is disposed outside of the main body 4c1 to provide the striking face 3 and has an area which is large enough to collide with the golf ball 2. These are fixed with a bolt or the like, which is not illustrated, in a detachable manner. Accordingly, by appropriately changing the material, planner shape and/or surface structure of the superficial material 4c2, it is possible to create approximate models of various kinds of club faces and to measure the contact force thereof.

The main body 4c1 may be formed of any material without limitation, but typically of stainless steel (SUS-630). The thickness of the main body 4c1 is typically in the range from 10 mm to 20 mm. Also, the main body 4c1 may have a planner shape which is substantially the same with that of the pressure sensor 4b, such as a square 40 mm to 60 mm on a side. Into the main body 4c1, one end of the main bolt 4d is screwed. As a result, the pressure sensor 4b is interposed between the base plate 4a and the main body 4c1, and the position thereof is fixed.

As to the superficial material 4c2 which provides the striking face 3 of the collisional plate 4, various materials, planner shapes and surface structures may be adopted, however, the superficial material 4c2 is preferably formed of the same material as the face (not shown) of the golf club head which is subject to an analysis. In the present invention, in view of evaluating a model of approach shots, stainless SUS-431 which is the same material as the head material of CG-15 manufactured by Cleveland Golf is used as the superficial material 4c2. The thickness of the superficial material 4c2 may be arbitrarily changed, for example, within the range of 1.0 mm to 5.0 mm. The planner shape of the superficial material 4c2 is substantially the same with that of the main body 4c1, for example, a square 40 mm to 60 mm on a side.

The contact force tester 1 includes a strobe device 7 and a high speed type camera device 8 which can take a photograph of the collision between the golf ball 2 and the striking face 3 and the golf ball 2 that rebounds from the striking face 3. The strobe device 7 is connected to a strobe power 9. The camera device 8 is connected to a camera power 10 via a capacitor box. The imaged data is memorized in the computer device PC. By including these devices, a slipping velocity at the time of the collision between the golf ball 2 and the striking face 3 which will be explained later, a contact area, and a launch speed, a launch angle and a backspin rate of a golf ball can be measured.

Figure 4:
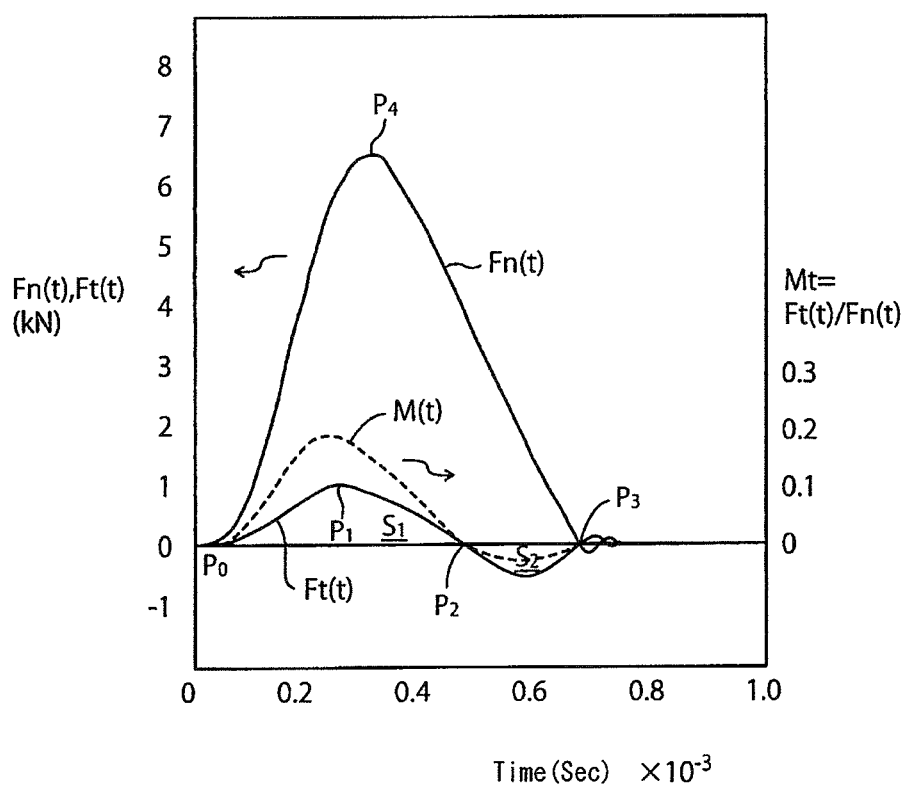
FIG. 4 is a graph illustrating Ft(t), Fn(t), and M(t)

FIG. 4 shows the time history of the perpendicular force Fn and the shear force Ft applied to the striking face 3 at the time of the collision by the golf ball 2 measured by the contact force tester 1.

FIG. 4 is a graph illustrating an example of Fn(t) and Ft(t) measured by the tester shown in FIGS. 2 and 3. In FIG. 4, a point P0 represents a point where the pressure sensor 4b starts sensing force, and generally corresponds to the point at which the striking face 3 and the golf ball 2 come into collision with each other. Fn(t) which is a contact force in the perpendicular direction gradually increases from the point P0, peaks at a point P4, and comes down therefrom to reach zero at a point P3. The point P3 represents a point where the pressure sensor 4b no longer senses force, and generally corresponds to the point where the golf ball 2 leaves the striking face 3.

On the other hand, the value of Ft(t) which is a contact force (i.e., shear force) in the direction parallel to the collisional plate increases with time from the point P0, peaks at a point P1, and comes down therefrom to reach zero at a point P2 after which it takes a negative value. Since the golf ball leaves the pressure sensor 4b at the point P3, the curve of Ft(t) sensed by the pressure sensor 4b takes zero at the point P3. An area S1 of the region where Ft(t) takes a positive value within the region surrounded by the curve of Ft(t) and the time axis represents impulse where the shear force is positive. On the other hand, an area S2 of the region where Ft(t) takes a negative value within the region surrounded by the curve of Ft(t) and the time axis represents impulse where the shear force is negative. Impulse S1 acts in a direction promoting back spin, and impulse S2 acts in a direction inhibiting back spin. Here, impulse S1 takes a larger value than impulse S2, and a value obtained by subtracting impulse S2 from impulse S1 contributes to back spin of a golf ball.

A coefficient of friction can be obtained by calculating a maximum value of M(t) which is expressed by Ft(t)/Fn(t).

In the present invention, the coefficient of friction obtained as described above is preferably 0.35 or more, more preferably 0.37 or more, even more preferably 0.39 or more, and is preferably 0.60 or less, more preferably 0.56 or less, even more preferably 0.54 or less. If the coefficient of friction falls within the above range, the spin rate on approach shots becomes better.

EXAMPLES

Hereinafter, the present invention will be described in detail by way of example. The present invention is not limited to examples described below. Various changes and modifications can be made without departing from the spirit and scope of the present invention.

[Evaluation Method]

(1) Mechanical Properties of Cover

A sheet with a thickness of about 2 mm was prepared by injection molding the cover composition, and stored at 23° C. for two weeks. According to ISO 527-1, a dumbbell-shape test piece (distance between marked lines: 73 mm, width of parallel part: 5.0 mm) was prepared from the sheet, the mechanical properties of the test piece were measured using a tensile tester (tension speed: 100 mm/min, measurement temperature: 23° C.) manufactured by Shimadzu Corporation, and the modulus (tensile elastic modulus) at 10% elongation was calculated.

(2) Slab Hardness (Shore D Hardness)

A sheet with a thickness of about 2 mm was produced by injection molding the cover composition or the intermediate layer composition, and stored at 23° C. for two weeks. Three or more of these sheets were stacked on one another so as not to be affected by the measuring substrate on which the sheets were placed, and the hardness of the stack was measured with a type P1 auto loading durometer manufactured by Kobunshi Keiki Co., Ltd., provided with a Shore D type spring hardness tester prescribed in ASTM-D2240.

(3) Mechanical Properties of Paint Film

The base agent and curing agent were blended to prepare a paint. The obtained paint was dried and cured at 40° C. for 4 hours to prepare a paint film. According to JIS-K7161, this paint film was punched out in a dumbbell shape (distance between marked lines: 20 mm, width of parallel part: 10 mm) to prepare a test piece, the mechanical properties of the test piece were measured using a tensile tester manufactured by Shimadzu Corporation, and the modulus (tensile elastic modulus) at 10% elongation was calculated.

Thickness of test piece: 0.05 mm
Tension speed: 50 mm/min
Measurement temperature: 23° C.

(4) Measurement of Coefficient of Friction and Spin Rate

The coefficient of friction and spin rate of golf balls were measured using a contact force tester shown in FIG. 2.

(4-1) Specification of Tester (A) Launcher: air gun system
(B) Collisional plate:
  Base plate 4a
    Steel
    Thickness: 5.35 mm
  Superficial plate 4c
    Main body 4c1
      Size: 56 mm×56 mm×15 mm
      Stainless steel (SUS-630)
  Superficial material 4c2
      Size: 56 mm×56 mm×2.5 mm
      Metal composition: SUS-431
      Groove shape: see FIG. 5
  Angle of inclination ($\alpha$)
    35 degrees (to flying direction of golf ball)
(C) Pressure sensor 4b
  A 3-component force sensor (model 9067) available from Kistler Instrument Corp.
  Charge amplifier
  Model 5011B available from Kistler Instrument Corp.
(D) Capture of contact force into PC
  A pulse counter board PCI-6101 (manufactured by Interface Corporation) was used. With a 16-bit PCI pulse counter board having 4 channels, measurement suited for a specific application may be realized in four counter modes. The maximum input frequency is 1 MHz.

Figure 5:
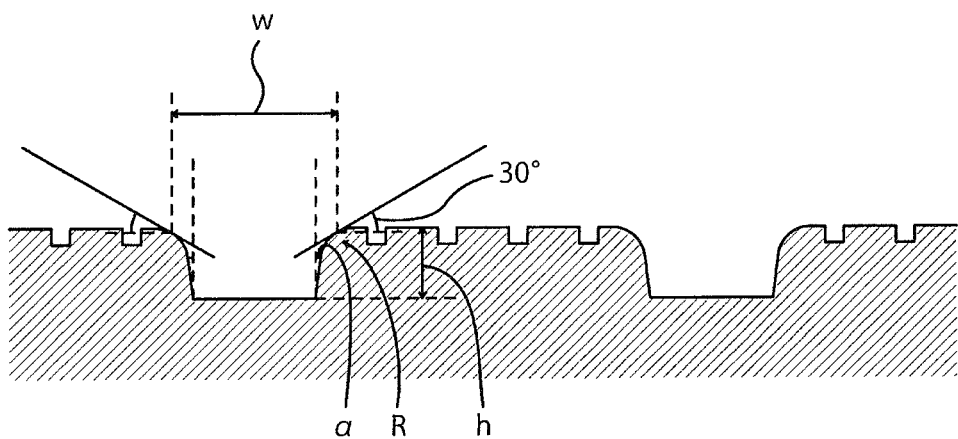
FIG. 5 is a cross-sectional view of the groove shape of the superficial material of the contact force tester.
Figure 5:
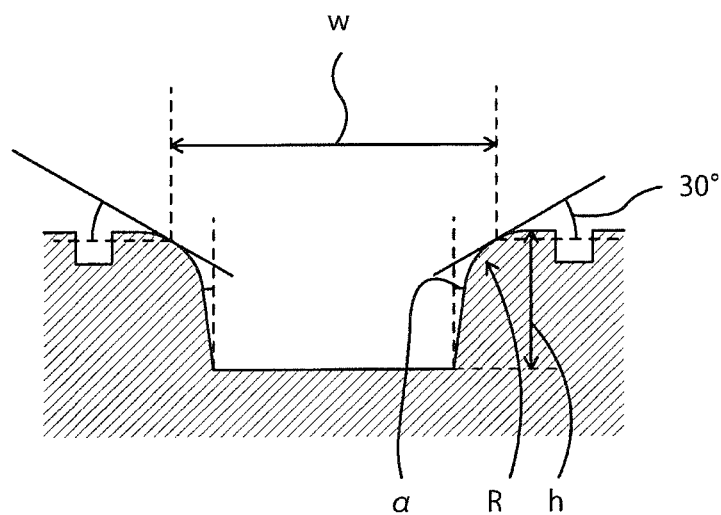

As shown in FIG. 5, the groove structure of a sand wedge CG-15 available from Cleveland Golf is reproduced on the striking face 3 of the collisional plate 4. As shown in FIG. 5 (a), on the striking face 3, large grooves (zip grooves) are formed, and a plurality of small grooves are formed on the surface between the large grooves (zip grooves). FIG. 5 (b) is an enlarged view of cross-section structure of the zip groove. The dimensions of the zip groove are as follow.

Zip groove (groove) width W: 0.70 mm
Zip groove (groove) depth h: 0.50 mm
Zip groove (groove) pitch: 3.56 mm
Zip groove (groove) angle $\alpha$: 10°
Zip groove shoulder R: 0.25

A plurality of small grooves between the zip grooves are formed by a laser-milling method so that the surface portion between the zip grooves has a surface roughness Ra=2.40±0.8 μm and Rmax=14.0±8 μm. It is noted that the surface roughness Ra and Rmax are measured by using SJ-301 manufacture by Mitsutoyo Corporation under the conditions of specimen length=2.5 mm and cut off value=2.5 mm.

(4-2) Measuring Procedure

Measurement of the coefficient of friction was conducted in the following manner. The measurement temperature was 23° C., and the initial speed of the ball was 9 m/s. The measurement was conducted twelve times for each golf ball, and the average value thereof was adopted as the measurement value for the golf ball.

(a) Setting the angle (a) of the collisional plate at 35 degrees to the flying direction (vertical direction) of the golf ball;

(b) Adjusting the air pressure of the launcher 5;

(c) Launching the golf ball from the launcher at the speed of 9 m/s;

(d) Measuring the initial velocity of the golf ball from the preset distance between the sensor 1 and sensor 2 and the time difference between the times for the golf ball to interrupt the sensors 1 and 2;

(e) Measuring the contact force Fn(t) and contact force Ft(t), and calculating the maximum value of Ft(t)/Fn(t); and (f) Measuring the spin rate of the golf ball with the strobe device and camera device.

(4-3) Result of Measurement

Figure 6:
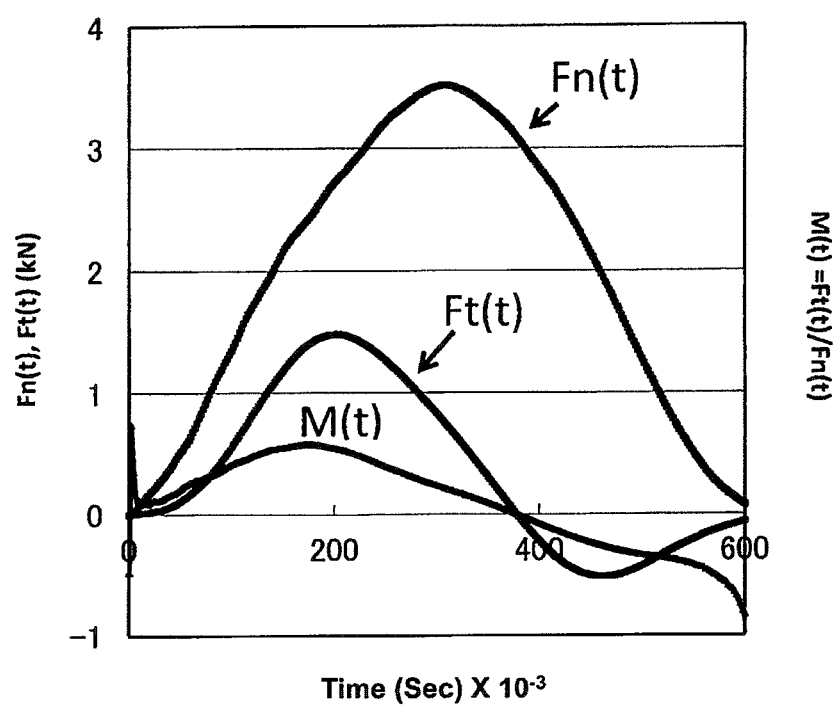
FIG. 6 is a graph illustrating Ft(t), Fn(t), and M(t)

An example of the results obtained with the tester in the above measuring procedure is shown in FIG. 6. From FIG. 6, the value of M(t) was calculated as Ft(t)/Fn(t), the maximum value thereof was 0.58. Since noise tends to generate in initial period where contact force rises up and in terminal period for measuring Ft and Fn, the maximum value of M(t) is calculated after trimming an early stage of the initial period and late stage of the terminal period.

(5) Stain Resistance

The golf ball was immersed for 30 seconds in an aqueous solution of tincture of iodine which was obtained by diluting a tincture of iodine (an ethanol solution containing 6 mass % of iodine and 4 mass % of potassium iodide) to 40 times, and then taken out. After the extra aqueous solution of tincture of iodine adhered on the surface of the golf ball was wipe off, color tones (L, a, b) of the golf ball before and after the immersion were measured by using a color difference meter (CM3500D manufactured by Konica Minolta Inc.), and a color difference (ΔE) was calculated according to the following equation. The larger the value of the color difference (ΔE) is, the larger the extent of color changing is.

$$\Delta E = [(\Delta L)^2 + (\Delta a)^2 + (\Delta b)^2]^{1/2}$$

Evaluation Standard

E (Excellent): ΔE is 15 or less
G (Good): ΔE is more than 15 and 20 or less
F (Fair): ΔE is more than 20 and less than 25
P (Poor): ΔE is 25 or more (6) Shot Feeling An actual hitting test was carried out by ten amateur golfers (high skilled persons) using a sand wedge (CG 15 forged wedge (52°) available from Cleveland Golf). In accordance with the number who answered the shot feeling was good (feeling like that the golf ball was lifted on the club face, feeling like that the golf ball gripped on the club surface, feeling like that the spin was imparted, feeling like that the golf ball was stuck on the club face, etc.), the golf balls were evaluated as follows.

E (Excellent): 8 or more
G (Good): 4 to 7
P (Poor): 3 or less (7) Flight Distance (m)

A metal-headed W#1 driver (XXIO, Shaft: S, loft: 11°, manufactured by Dunlop Sports Limited) was installed on a swing robot M/C manufactured by Golf Laboratories, Inc. The golf ball was hit at a head speed of 40 m/sec, and the flight distance (the distance from the launch point to the stop point) was measured. This measurement was conducted twelve times for each golf ball, and the average value thereof was adopted as the measurement value for the golf ball.

[Preparation of Three-Piece Golf Balls No. 1-No. 39]

1. Preparation of Center

The center rubber composition having a formulation shown in Table 1 was kneaded and heat-pressed in upper and lower molds, each having a hemispherical cavity, at a temperature of 170° C. for 20 minutes to obtain the spherical centers (Golf balls No. 1-20: diameter 39.8 mm; Golf balls No. 21-39: diameter 39.2 mm).

TABLE 1

| Center composition | Formulation (parts by mass) |
| --- | --- |
| Polybutadiene | 100 |
| Zinc acrylate | 35 |
| Zinc oxide | 5 |
| Barium sulfate | Appropriate amount*) |
| Diphenyl disulfide | 0.5 |
| Dicumyl peroxide | 0.9 |

*) Adjustment was made such that the golf ball had a mass of 45.3 g.
Polybutadiene: "BR730 (high cis-polybutadiene)" manufactured by JSR Corporation
Zinc acrylate: "ZN-DA90S" manufactured by NIHON JYORYU KOGYO Co,. LTD.
Zinc oxide: "Ginrei R" manufactured by Toho-Zinc Co.
Barium sulfate: "Barium Sulfate BD" manufactured by Sakai Chemical Industry Co., Ltd.
Diphenyl disulfide: manufactured by Sumitomo Seika Chemicals Company Limited
Dicumyl peroxide: "Percumyl (register trademark) D" manufactured by NOF Corporation 2. Preparation of Intermediate Layer Composition and Cover Composition The material having a formulation shown in Tables 2 or 3 was mixed using a twing screw kneading extruder to obtain the intermediate layer composition or the cover composition in a pellet form. The extrusion was conducted in the following conditions: screw diameter=45 mm, screw revolution=200 rpm, and screw L/D=35. The blended material was heated to 200° C. to 260° C. at the die position of the extruder.

TABLE 2

| Intermediate layer composition | Formulation (parts by mass) |
| --- | --- |
| Surlyn 8945 | 55 |
| Himilan AM7329 | 45 |
| Titanium dioxide | 4 |

Surlyn 8945: Sodium ion-neutralized ethylene-methacrylic acid copolymer ionomer resin manufactured by E.I. du Pont de Nemours and Company
Himilan AM7329: Zinc ion-neutralized ethylene-methacrylic acid copolymer ionomer resin manufactured by Du Pont-Mitsui Polychemicals Co., Ltd

TABLE 3

| Cover composition No. | | a | b | c | d | A | B | C | D | E | F |
| --- | --- | --- | --- | --- | --- | --- | --- | --- | --- | --- | --- |
| Formulation (parts by mass) | Elastollan XNY75A | 100 | — | — | — | — | — | — | — | — | — |
| | Elastollan XNY83A | — | 100 | — | — | — | — | — | — | — | — |
| | Elastollan XNY90A | — | — | 100 | — | — | — | — | — | — | — |
| | Elastollan XNY95A | — | — | — | 100 | — | — | — | — | — | — |
| | Himilan AM7327 | — | — | — | — | 100 | — | — | — | — | — |
| | HPF 1000 | — | — | — | — | — | 100 | — | — | — | — |
| | Himilan 1605 | — | — | — | — | — | — | 57 | 50 | — | — |
| | Himilan AM7329 | — | — | — | — | — | — | 40 | 50 | — | 15 |
| | Rabalon T3221C | — | — | — | — | — | — | 3 | — | — | — |
| | Surlyn 8150 | — | — | — | — | — | — | — | — | 50 | — |
| | Surlyn 9150 | — | — | — | — | — | — | — | — | 50 | — |
| | Surlyn 8945 | — | — | — | — | — | — | — | — | — | 15 |
| | Novamid ST120 | — | — | — | — | — | — | — | — | — | 70 |
| | Titanium dioxide | 4 | 4 | 4 | 4 | 4 | 4 | 4 | 4 | 4 | 4 |
| | Ultramarine blue | 0.08 | 0.08 | 0.08 | 0.08 | 0.08 | 0.08 | 0.08 | 0.08 | 0.08 | 0.08 |

TABLE 3-continued

| Cover composition No. | a | b | c | d | A | B | C | D | E | F |
|---|---|---|---|---|---|---|---|---|---|---|
| Slab hardness (Shore D) | 10 | 25 | 45 | 50 | 41 | 55 | 61 | 66 | 70 | 73 |
| 10% elastic modulus (kgf/cm$^2$) | 8.7 | 16 | 26 | 55 | 34 | 97 | 120 | 175 | 240 | 265 |

Elastollan XNY75A: Thermoplastic polyurethane elastomer manufactured by BASF Japan Ltd.
Elastollan XNY83A: Thermoplastic polyurethane elastomer manufactured by BASF Japan Ltd.
Elastollan XNY90A: Thermoplastic polyurethane elastomer manufactured by BASF Japan Ltd.
Elastollan XNY95A: Thermoplastic polyurethane elastomer manufactured by BASF Japan Ltd.
Himilan AM7327: Zinc ion-neutralized ethylene-methacrylic acid-butyl acrylate ternary copolymer ionomer resin manufactured by Du Pont-Mitsui Polychemicals Co., Ltd
HPF1000: Magnesium ion-neutralized ethylene-methacrylic acid copolymer ionomer resin manufactured by E.I. du Pont de Nemours and Company, Inc.
Himilan 1605: Sodium ion-neutralized ethylene-methacrylic acid copolymer ionomer resin manufactured by Du Pont-Mitsui Polychemicals Co., Ltd
Himilan AM7329: Zinc ion-neutralized ethylene-methacrylic acid copolymer ionomer resin manufactured by Du Pont-Mitsui Polychemicals Co., Ltd
Rabalon T3221C: Thermoplastic polystyrene elastomer manufactured by Mitsubishi Chemicals Inc.
Surlyn 8150: Sodium ion-neutralized ethylene-methacrylic acid copolymer ionomer resin manufactured by E.I. du Pont de Nemours and Company, Inc.
Surlyn 9150: Zinc ion-neutralized ethylene-methacrylic acid copolymer ionomer resin manufactured by E.I. du Pont de Nemours and Company, Inc.
Surlyn 8945: Sodium ion-neutralized ethylene-methacrylic acid copolymer ionomer resin manufactured by E.I. du Pont de Nemours and Company, Inc.
Novamid ST120: Polyamide resin composition manufactured by DSM Japan Engineering Plastics K.K.

3. Preparation of Spherical Core

The intermediate layer composition obtained above was injection molded directly on the center obtained as described above to produce the intermediate layer (thickness: 1.0 mm) covering the center, thereby obtaining the spherical core. Upper and lower molds for molding have a semi-spherical cavity and hold pins which are retractable and hold the spherical core. When molding the intermediate layer, the hold pins were protruded to hold the center after the center was put therein, the intermediate layer composition heated to 260° C. was charged into the mold held under a pressure of 80 tons for 0.3 seconds, and cooled for 30 seconds. Then, the mold was opened, and the spherical core was taken out from the mold.

4. Molding of Half Shell

Compression molding of the half shells was conducted by charging the obtained cover composition in a pellet form into each concave portion of the lower mold of the mold which was used for molding the half shells, and performing compression to mold the half shells. Compression molding was conducted at the temperature of 170° C. for 5 minutes under the molding pressure of 2.94 MPa.

5. Molding of Cover

The spherical core obtained above was covered concentrically with two half shells, and the cover (Golf ball Nos. 1-20: thickness 0.5 mm, Golf ball Nos. 21-39: thickness 0.8 mm) was molded by compression molding. Compression molding was conducted at the temperature of 145° C. for 2 minutes under the molding pressure of 9.8 MPa.

6. Preparation of Paint
Preparation of Base Agent

As a polyol component, polytetramethylene ether glycol (PTMG) and trimethylolpropane (TMP) were dissolved in a solvent (toluene and methyl ethyl ketone). Then, dibutyl tin laurate which was used as a catalyst was added therein in an amount of 0.1 mass % with respect to the total amount of the base agent. While keeping the temperature of the obtained polyol solution at 80° C., isophorone diisocyanate (IPDI) which was used as a polyisocyanate component was added dropwise to the polyol solution and mixed. After adding of isophorone diisocyanate was finished, stirring was continued until the polyisocyanate component no longer existed. Then, the reaction liquid was cooled at the room temperature to obtain the urethane polyol (solid content: 30 mass %). The compositions of the obtained urethane polyols are shown in Table 4.

TABLE 4

| Urethane polyol No. | | 1 | 2 | 3 | 4 | 5 |
|---|---|---|---|---|---|---|
| Component | Polyol component | PTMG TMP | PTMG TMP | PTMG TMP | PTMG TMP | PTMG TMP |
| | Polyisocyanate component | IPDI | IPDI | IPDI | IPDI | IPDI |
| Number average molecular weight of PTMG | | 650 | 800 | 1000 | 1500 | 2000 |
| TMP:PTMG (molar ratio) | | 1.8:1.0 | 1.8:1.0 | 1.8:1.0 | 1.8:1.0 | 1.8:1.0 |
| Molar ratio (NCO/OH) of NCO group of polyisocyanate component to OH group of polyol component | | 0.6 | 0.6 | 0.6 | 0.6 | 0.6 |
| Content of PTMG (mass %) | | 67 | 71 | 76 | 82 | 86 |
| Hydroxyl value of solid component (mgKOH/g) | | 67.4 | 58.3 | 49.5 | 35.9 | 28.2 |
| Weight average molecular weight | | 4867 | 5620 | 6624 | 9135 | 11646 |

Preparation of Curing Agent 30 parts by mass of an isocyanurate-modified product of hexamethylene diisocyanate (Duranate (registered trademark) TKA-100 (NCO content: 21.7 mass %) available from Asahi Kasei Chemicals Corporation), 30 parts by mass of a biuret-modified product of hexamethylene diisocyanate (Duranate 21S-75E (NCO content: 15.5 mass %) available from Asahi Kasei Chemicals Corporation), and 40 parts by mass of isophorone diisocyanate (Desmodur (registered trademark) Z 4470 (NCO content: 11.9 mass %) available from Bayer company) were mixed. As a solvent, a mixed solvent of methyl ethyl ketone, n-butyl acetate and toluene was added therein to adjust the concentration of the polyisocyanate component as 60 mass %.

Preparation of Paint

To the above-prepared base agent or Polyn #950 (a urethane polyol formed from a polyol component (trimethylolpropane and polyoxytetramethylene glycol) and a polyisocyanate component (isophorone diisocyanate) and having a hydroxyl value of 128 mgKOH/g, available from Shinto Paint Co., Ltd.), the curing agent was blended in a NCO/OH ratio shown in Tables 5 to 8, to prepare the paint.

7. Formation of Paint Film

Figure 7:
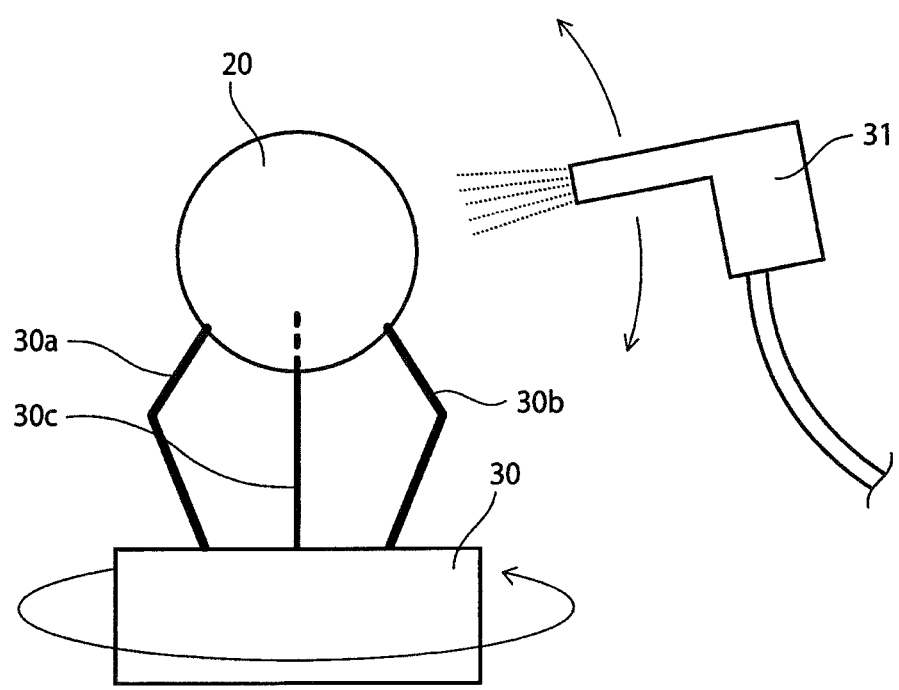
FIG. 7 is a schematic view illustrating an embodiment of applying the paint with an air gun.
Figure 8:
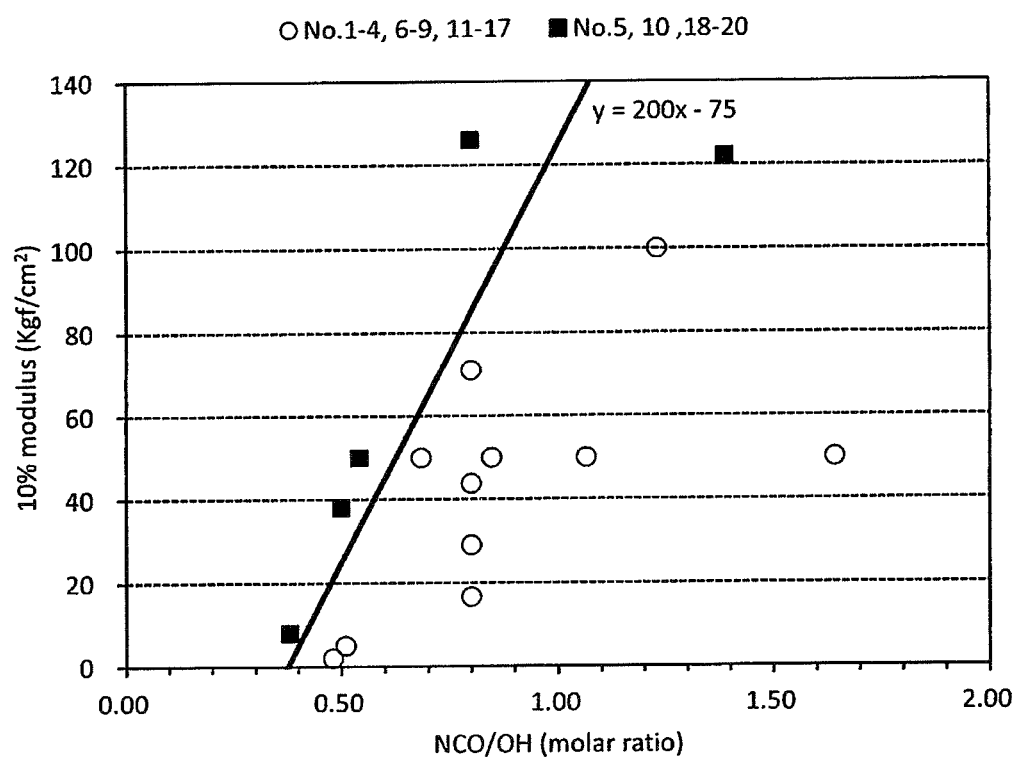
FIG. 8 is a graph illustrating the relation between NCO/OH (molar ratio) and 10% elastic modulus (kgf/cm²) of the paint film.

The surface of the golf ball body obtained above was subjected to the sandblast treatment, and the mark was formed thereon. Then, the paint was applied to the golf ball body with the spray gun, and the paint was dried in the oven heated at 40° C. for 24 hours to prepare the golf ball having a mass of 45.3 g. The thickness of the paint film was 20 μm. Application of the paint was conducted as follows. The golf ball body 20 was placed in the rotating member 30 provided with three prongs 30a to 30c shown in FIG. 7, which rotated at 300 rpm. Application of the paint was conducted by spacing a spray distance (7 cm) between the air gun 31 and the golf ball body 20 while moving the air gun 31 in a up and down direction. The painting interval in the overpainting operation was set to 1.0 second. Application of the paint was conducted under the spraying conditions of overpainting operation: twice, spraying air pressure: 0.15 MPa, compressed air tank pressure: 0.10 MPa, painting time per one application: 1 second, atmosphere temperature: 20° C. to 27° C., and atmosphere humidity: 65% or less. The evaluation results of the obtained golf balls are shown in Tables 5 to 8. The relationship between NCO/OH (molar ratio) of the paint film and 10% elastic modulus (kgf/cm$^2$) is shown in FIG. 8.

TABLE 5

| | | Golf ball No. | 1 | 2 | 3 | 4 | 5 | 6 | 7 | 8 | 9 |
|---|---|---|---|---|---|---|---|---|---|---|---|
| Paint | Main agent | Urethane polyol No. | 2 | 3 | 4 | 5 | 1 | 2 | 3 | 4 | 5 |
| | | Number average molecular weight of PTMG | 800 | 1000 | 1500 | 2000 | 650 | 800 | 1000 | 1500 | 2000 |
| | | Curing agent/Base agent (NCO/OH molar ratio) | 0.80 | 0.80 | 0.80 | 0.80 | 0.54 | 0.68 | 0.85 | 1.06 | 1.64 |
| Properties of paint film | | 10% elastic modulus (kgf/cm$^2$) (Mp) | 71 | 44 | 29 | 17 | 50 | 50 | 50 | 50 | 50 |
| | | 200 × [NCO/OH]−75 | 85 | 85 | 85 | 85 | 33 | 62 | 94 | 138 | 253 |
| Cover | | Cover composition No. | b | b | b | b | b | b | b | b | b |
| | | Slab hardness (Shore D) | 25 | 25 | 25 | 25 | 25 | 25 | 25 | 25 | 25 |
| | | 10% elastic modulus (kgf/cm$^2$) (Mc) | 16 | 16 | 16 | 16 | 16 | 16 | 16 | 16 | 16 |
| Golf ball | | Difference of 10% elastic modulus (kgf/cm$^2$) (|Mp-Mc|) | 55 | 28 | 13 | 1 | 34 | 34 | 34 | 34 | 34 |
| | | Coefficient of friction | 0.42 | 0.48 | 0.51 | 0.55 | 0.45 | 0.45 | 0.45 | 0.45 | 0.45 |
| | | Spin rate (rpm) | 3002 | 3071 | 3101 | 3131 | 3025 | 3044 | 3061 | 3072 | 3087 |
| | | Stain resistance | G | G | G | G | P | G | G | E | E |
| | | Shot feeling | G | E | E | E | G | G | G | G | G |

TABLE 6

| | | Golf ball No. | 10 | 11 | 12 | 13 | 14 | 15 | 16 | 17 | 18 | 19 | 20 |
|---|---|---|---|---|---|---|---|---|---|---|---|---|---|
| Paint | Main agent | Urethane polyol No. | 3 | 3 | 3 | 3 | 3 | 3 | 3 | 3 | Poly #950 | | |
| | | Number average molecular weight of PTMG | 1000 | 1000 | 1000 | 1000 | 1000 | 1000 | 1000 | 1000 | Less than 800 | | |
| | | Curing agent/Base agent (NCO/OH molar ratio) | 1.39 | 1.23 | 0.51 | 0.48 | 0.80 | 0.80 | 0.80 | 1.23 | 0.38 | 0.50 | 0.80 |
| Properties of paint film | | 10% elastic modulus (kgf/cm$^2$) (Mp) | 122 | 100 | 5 | 2 | 44 | 44 | 44 | 100 | 8 | 38 | 126 |
| | | 200 × [NCO/OH]−75 | 203 | 171 | 27 | 21 | 85 | 85 | 85 | 171 | 1 | 25 | 85 |
| Cover | | Cover composition No. | b | b | b | b | a | c | d | d | b | b | b |
| | | Slab hardness (Shore D) | 25 | 25 | 25 | 25 | 10 | 45 | 50 | 50 | 25 | 25 | 25 |
| | | 10% elastic modulus (kgf/cm$^2$) (Mc) | 16 | 16 | 16 | 16 | 8.7 | 26 | 55 | 55 | 16 | 16 | 16 |
| Golf ball | | Difference of 10% elastic modulus (kgf/cm$^2$) (|Mp-Mc|) | 106 | 84 | 11 | 14 | 35 | 18 | 11 | 45 | 8 | 22 | 110 |
| | | Coefficient of friction | 0.32 | 0.36 | 0.57 | 0.62 | 0.51 | 0.33 | 0.28 | 0.24 | 0.55 | 0.50 | 0.33 |
| | | Spin rate (rpm) | 2875 | 2921 | 3157 | 3172 | 3105 | 2855 | 2523 | 2312 | 3122 | 3090 | 2830 |
| | | Stain resistance | G | G | G | F | G | G | G | G | P | P | E |
| | | Shot feeling | F | F | E | E | E | E | E | G | E | E | P |

TABLE 7

| | | Golf ball No. | 21 | 22 | 23 | 24 | 25 | 26 | 27 | 28 | 29 | 30 |
|---|---|---|---|---|---|---|---|---|---|---|---|---|
| Paint | Main agent | Urethane polyol No. | 1 | 2 | 3 | 4 | 5 | 1 | 2 | 3 | 4 | 5 |
| | | Number average molecular weight of PTMG | 650 | 800 | 1000 | 1500 | 2000 | 650 | 800 | 1000 | 1500 | 2000 |
| | | Curing agent/Base agent (NCO/OH molar ratio) | 0.80 | 0.80 | 0.80 | 0.80 | 0.80 | 0.54 | 0.68 | 0.85 | 1.06 | 1.64 |
| Properties of paint film | | 10% elastic modulus (kgf/cm$^2$) | 107 | 71 | 44 | 29 | 17 | 50 | 50 | 50 | 50 | 50 |
| | | 200 × [NCO/OH]−75 | 85 | 85 | 85 | 85 | 85 | 33 | 62 | 94 | 138 | 253 |
| Cover | | Cover composition No. | C | C | C | C | C | C | C | C | C | C |
| | | Slab hardness (Shore D) | 61 | 61 | 61 | 61 | 61 | 61 | 61 | 61 | 61 | 61 |
| | | 10% elastic modulus (kgf/cm$^2$) | 120 | 120 | 120 | 120 | 120 | 120 | 120 | 120 | 120 | 120 |
| Golf ball | | Coefficient of friction | 0.31 | 0.40 | 0.46 | 0.49 | 0.53 | 0.43 | 0.43 | 0.43 | 0.43 | 0.43 |
| | | Flight distance on driver shots (m) | 220 | 220 | 220 | 220 | 220 | 220 | 220 | 220 | 220 | 220 |
| | | Stain resistance | E | G | G | G | P | G | G | G | E | E |
| | | Shot feeling | F | G | E | E | G | G | G | G | G | G |

TABLE 8

| Golf ball No. | | | 31 | 32 | 33 | 34 | 35 | 36 | 37 | 38 | 39 |
|---|---|---|---|---|---|---|---|---|---|---|---|
| Paint | Main agent | Urethane polyol No. | 3 | 3 | 3 | 3 | 3 | 3 | 3 | 3 | 3 |
| | | Number average molecular weight of PTMG | 1000 | 1000 | 1000 | 1000 | 1000 | 1000 | 1000 | 1000 | 1000 |
| | | Curing agent/Base agent (NCO/OH molar ratio) | 1.39 | 1.23 | 0.51 | 0.48 | 0.80 | 0.80 | 0.80 | 0.80 | 0.80 |
| Properties of paint film | | 10% elastic modulus (kgf/cm$^2$) | 122 | 100 | 5 | 2 | 44 | 44 | 44 | 44 | 44 |
| | | 200 × [NCO/OH]−75 | 203 | 171 | 27 | 21 | 85 | 85 | 85 | 85 | 85 |
| Cover | | Cover composition No. | C | C | C | C | A | B | D | E | F |
| | | Slab hardness (Shore D) | 61 | 61 | 61 | 61 | 41 | 55 | 66 | 70 | 73 |
| | | 10% elastic modulus (kgf/cm$^2$) | 120 | 120 | 120 | 120 | 34 | 97 | 175 | 240 | 265 |
| Golf ball | | Coefficient of friction | 0.30 | 0.34 | 0.55 | 0.60 | 0.47 | 0.50 | 0.32 | 0.27 | 0.27 |
| | | Flight distance on driver shots (m) | 220 | 220 | 220 | 220 | 218 | 219 | 221 | 222 | 223 |
| | | Stain resistance | G | G | G | F | G | G | G | G | G |
| | | Shot feeling | F | G | E | E | E | E | G | G | F |

In Golf ball Nos. 1-4, 6-9 and 11-17, the polyol composition constituting the paint film contains a urethane polyol including a polyether diol having a number average molecular weight from 800 to 3000 as a constituent component, the paint film has a 10% elastic modulus of 100 kgf/cm$^2$ or less, and the 10% elastic modulus (kgf/cm$^2$) of the paint film and the molar ratio (NCO/OH) satisfy the equation (1). These golf balls show a high spin rate on approach shots and an excellent stain resistance. Among these golf balls, Golf ball Nos. 1-4, 6-9 and 12-17, which have a difference between the 10% elastic modulus (kgf/cm$^2$) of the paint film and the 10% elastic modulus (kgf/cm$^2$) of the cover of 65 kgf/cm$^2$ or less, are also excellent in shot feeling.

In Golf ball Nos. 22-25, 27-30, 32-34 and 37-39, the polyol composition constituting the paint film contains a urethane polyol including a polyether diol having a number average molecular weight from 800 to 3000 as a constituent component, the paint film has a 10% elastic modulus of 100 kgf/cm$^2$ or less, the 10% elastic modulus (kgf/cm$^2$) of the paint film and the molar ratio (NCO/OH) satisfy the equation (1), and the 10% elastic modulus of the cover is 120 kgf/cm$^2$ or more. These golf balls show a great flight distance on driver shots, and are excellent in stain resistance and shot feeling.

The present invention is useful for a painted golf ball. This application is based on Japanese Patent applications No. 2013-272858 filed on Dec. 27, 2013 and No. 2013-272859 filed on Dec. 27, 2013, the contents of which are hereby incorporated by reference.

The invention claimed is:

1. A golf ball comprising a golf ball body and a paint film formed on a surface of the golf ball body,
   wherein a base resin constituting the paint film is a polyurethane obtained by a reaction between a polyol composition and a polyisocyanate composition,
   the polyol composition contains a urethane polyol including a polyether diol having a number average molecular weight from 800 to 3000 as a constituent component,
   the urethane polyol has a weight average molecular weight ranging from 5000 to 9135,
   the paint film has a 10% elastic modulus of 100 kgf/cm$^2$ or less, and
   the 10% elastic modulus (kgf/cm$^2$) of the paint film and a molar ratio (NCO/OH) of the isocyanate group (NCO) of the polyisocyanate composition to the hydroxyl group (OH) of the polyol composition satisfy a following equation (1);

$$Y \leq 200 \times X - 75 \quad (1)$$

in the equation, Y represents the 10% elastic modulus (kgf/cm$^2$) of the paint film, X represents the molar ratio (NCO/OH) of the isocyanate group (NCO) of the polyisocyanate composition to the hydroxyl group (OH) of the polyol composition.

2. The golf ball according to claim 1, wherein the molar ratio (NCO/OH) of the isocyanate group (NCO) of the polyisocyanate composition to the hydroxyl group (OH) of the polyol composition is more than 0.5 and 1.2 or less.

3. The golf ball according to claim 1, wherein a content of the urethane polyol in a polyol compound contained in the polyol composition is 60 mass % or more.

4. The golf ball according to claim 1, wherein the urethane polyol has a hydroxyl value ranging from 10 mgKOH/g to 200 mgKOH/g.

5. The golf ball according to claim 1, wherein the urethane polyol includes a triol component as a constituent component.

6. The golf ball according to claim 5, wherein a polyol component constituting the urethane polyol includes the triol component and a diol component in a mixing ratio (triol component/diol component) of the triol component to the diol component ranging from 0.2 to 6.0 in a mass ratio.

7. The golf ball according to claim 1, wherein a content of the polyether diol having a number average molecular weight from 800 to 3000 in the urethane polyol is 70 mass % or more.

8. The golf ball according to claim 1, wherein the polyisocyanate composition contains a triisocyanate compound.

9. The golf ball according to claim 8, wherein a content of the triisocyanate compound in a polyisocyanate compound contained in the polyisocyanate composition is 50 mass % or more.

10. The golf ball according to claim 1, wherein the golf ball has a coefficient of friction calculated using a contact force tester is 0.35 or more and 0.60 or less.

11. The golf ball according to claim 1, wherein the paint film has a thickness of 5 μm or more and 50 μm or less.

12. The golf ball according to claim 1, wherein the golf ball body comprises a core and a cover covering the core, and an absolute value of a difference between the 10% elastic modulus (kgf/cm$^2$) of the paint film and a 10% elastic modulus (kgf/cm$^2$) of the cover is 65 kgf/cm$^2$ or less.

13. The golf ball according to claim 12, wherein the 10% elastic modulus of the cover is less than 120 kgf/cm$^2$.

14. The golf ball according to claim 12, wherein the cover has a slab hardness of 60 or less in Shore D hardness.

15. The golf ball according to claim 12, wherein the cover is formed from a cover composition containing a polyurethane.

16. The golf ball according to claim 1, wherein the golf ball body comprises a core and a cover covering the core, and the cover has a 10% elastic modulus of 120 kgf/cm$^2$ or more.

17. The golf ball according to claim 16, wherein the 10% elastic modulus of the cover is 280 kgf/cm$^2$ or less.

18. The golf ball according to claim 16, wherein the cover has a slab hardness of more than 60 in Shore D hardness.

19. The golf ball according to claim 16, wherein the cover is formed from a cover composition containing an ionomer resin and/or a polyamide.

* * * * *